United States Patent [19]

Iida et al.

[11] Patent Number: 5,353,414
[45] Date of Patent: Oct. 4, 1994

[54] BUS LOCK CONTROL APPARATUS CAPABLE OF CONTROLLING WITHOUT STOPPING BUS ARBITERS

[75] Inventors: Hiroshi Iida, Tokyo; Tsutomu Ban, Ehime, both of Japan

[73] Assignee: NEC Corporation, Tokyo, Japan

[21] Appl. No.: 953,205

[22] Filed: Sep. 29, 1992

Related U.S. Application Data

[63] Continuation of Ser. No. 544,864, Jun. 28, 1990, abandoned.

[30] Foreign Application Priority Data

Jun. 30, 1989 [JP] Japan ................................ 1-166923

[51] Int. Cl.⁵ ........................................... G06F 13/366
[52] U.S. Cl. ................... 395/325; 364/DIG. 1; 364/240; 364/240.9; 364/242.6; 364/242.92; 364/270; 364/270.1; 364/271.5
[58] Field of Search ............... 395/325, 725, 275, 375

[56] References Cited

U.S. PATENT DOCUMENTS

| | | | |
|---|---|---|---|
| 4,096,569 | 6/1978 | Barlone | 395/325 |
| 4,449,183 | 5/1984 | Flahive et al. | 395/425 |
| 4,488,218 | 12/1984 | Grimes | 395/325 |
| 4,554,628 | 11/1985 | Bell | 395/325 |
| 4,570,220 | 2/1986 | Tetrick et al. | 395/325 |
| 4,573,118 | 2/1986 | Damonny et al. | 395/775 |
| 4,574,350 | 3/1986 | Starr | 395/725 |
| 4,620,278 | 10/1986 | Ellsworth et al. | 395/325 |
| 4,627,018 | 12/1986 | Trost et al. | 395/425 |
| 4,633,392 | 12/1986 | Vincent et al. | 395/325 |
| 4,633,394 | 12/1986 | Georgion et al. | 395/650 |
| 4,779,089 | 10/1988 | Thens | 395/325 |
| 4,785,394 | 11/1988 | Fischer | 395/325 |
| 4,814,970 | 3/1989 | Barbagelata et al. | 395/200 |
| 4,881,195 | 11/1989 | DeLong et al. | 395/725 |
| 4,920,485 | 4/1990 | Vahihsafa | 395/725 |
| 4,949,239 | 8/1990 | Gillett, Jr. et al. | 395/425 |
| 4,953,072 | 8/1990 | Williams | 395/725 |
| 4,964,034 | 10/1990 | Jaskowiak | 395/275 |
| 4,979,099 | 12/1990 | Milia et al. | 395/325 |
| 5,029,076 | 7/1991 | Stewart et al. | 395/425 |
| 5,123,105 | 6/1992 | Wyland et al. | 395/725 |
| 5,167,022 | 11/1992 | Bahr et al. | 395/325 |
| 5,175,829 | 12/1992 | Stumpf et al. | 395/375 |

Primary Examiner—Allen R. MacDonald
Assistant Examiner—Ayaz R. Sheikh
Attorney, Agent, or Firm—Foley & Lardner

[57] ABSTRACT

A bus lock control apparatus including a bus arbiter having a register for storing bus lock enable information in correspondence with a plurality of agents, and a lock acknowledging means for acknowledging an OR signal of all pieces of information of the register to agents connected to the common bus. The lock acknowledging means is latched after a lapse of a predetermined period of time when a bus lock request or bus lock release request is enabled in the bus arbiter.

1 Claim, 2 Drawing Sheets

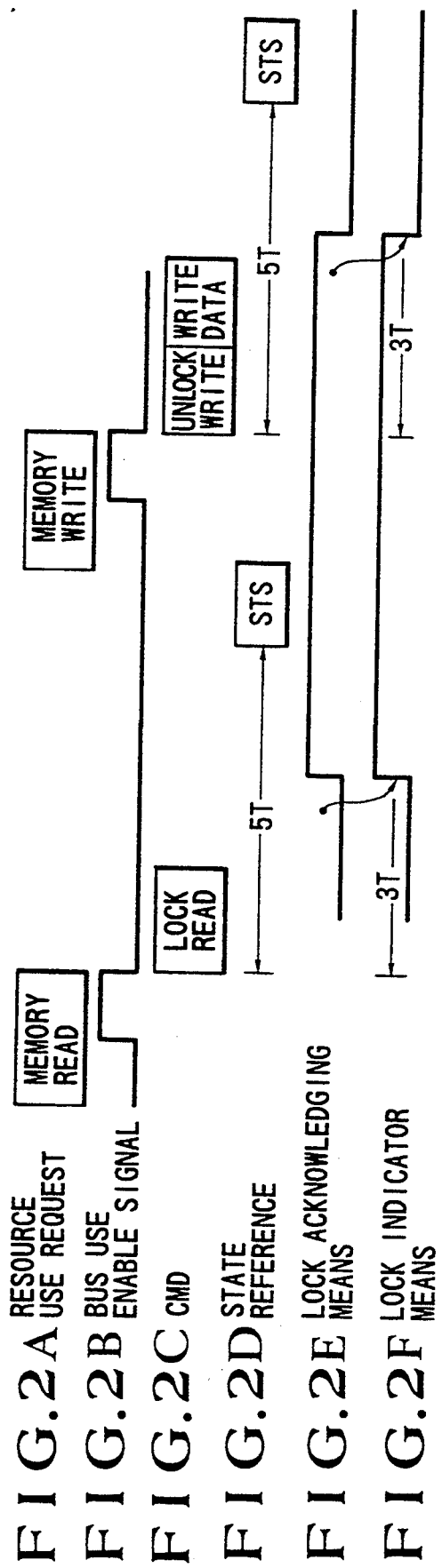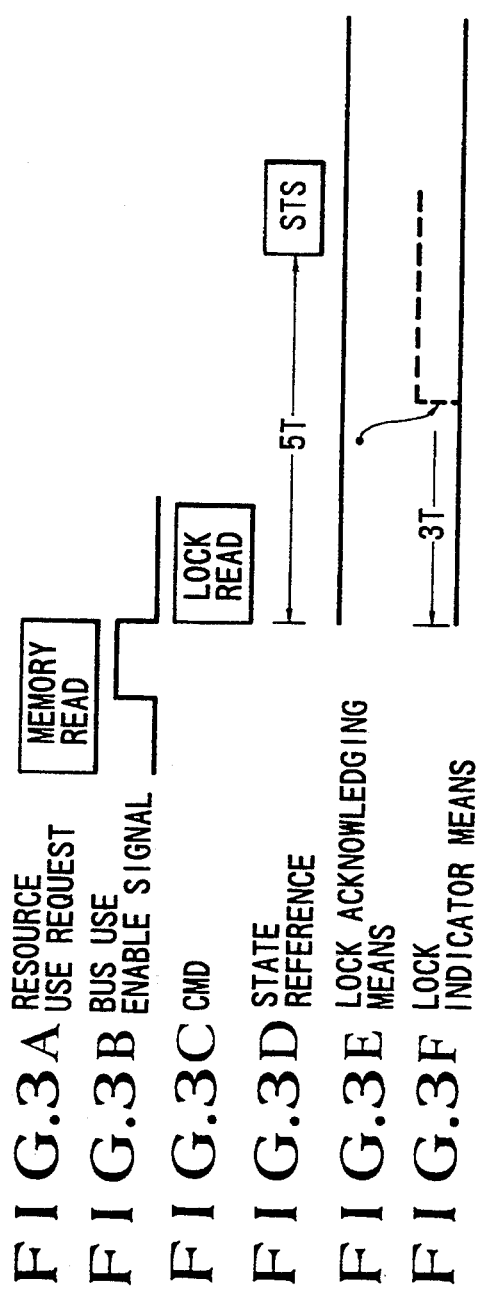

BUS LOCK CONTROL APPARATUS CAPABLE OF CONTROLLING WITHOUT STOPPING BUS ARBITERS

This application is a continuation of application Ser. No. 07/544,864, filed Jun. 28, 1990, abandoned.

BACKGROUND OF THE INVENTION

The present invention relates to a bus lock control apparatus required for semaphore management in a multiprocessor system having a common bus.

A conventional bus lock control apparatus has the following arrangement. A bus use request from each agent is sent to a bus arbiter, and the bus arbiter arbitrates the bus use requests of all agents. As a result of arbitration, the arbiter selects one of the agents which have sent the bus use requests, and sends a bus transmission enable signal to the selected agent. The selected agent reserves the right of bus use as a master agent until bus transmission is completed. During this transmission, the bus arbiter does not send a bus transmission enable signal to any other agent. Upon completion of the bus transmission by the master agent, the master agent loses the right of bus use. The bus arbiter performs bus arbitration again to determine a new master agent. In this manner, the bus arbiter and each agent repeat the above operation, so that a system having a common bus can be properly operated.

An operation performed when the master agent sends a bus lock request to the bus arbiter will be described below. When the bus arbiter sends a transmission enable signal in response to a bus lock request, the arbiter immediately interlocks the bus. In this interlocked state, bus arbitration is interrupted, and a bus transmission enable signal is sent back to only the master agent. The master agent does not lose the right of bus use upon completion of transmission of the bus lock request and keeps occupying the bus.

After the master agent outputs a bus lock release request and this bus cycle is completed, the bus arbiter releases the bus interlocked state and restarts bus arbitration. That is, use of the bus by only the master agent is allowed during the bus interlocked period.

In the conventional bus lock apparatus, the bus lock request is used as a lock read signal, and the bus lock release request is used as an unlock write signal. During an interval from the lock read signal to the unlock write signal, the bus is interlocked. When the master agent checks a memory content read out by the lock read signal and determines if the memory content is write-accessible, predetermined data is written again in a memory. However, if the memory content is not write-accessible, read data is written in the memory by the unlock write signal. This data is used to manage the semaphore in the memory. In the multiprocessor system, in order to prevent a plurality of processors from using the same semaphore, a use/nonuse state of the semaphore is represented by a semaphore header. Contention of the plurality of processors for this semaphore header is controlled such that the bus is interlocked using the lock read and unlock write signals to assure a sequence from a memory read operation to a memory write operation of each independent processor, thereby performing exclusive control.

A common bus system having a higher speed and a larger capacity than those of a conventional common bus system is proposed. In these bus arbitration systems, a plurality of bus cycles which overlap each other are generated in response to a bus cycle from the first initial resource use request transmission to response status reception in each bus arbitration system described above, thereby increasing the bus transfer speed. When a lock control system using a bus interlock scheme in such a bus arbitration system, the bus cycles cannot overlap each other, thus resulting in a contradiction.

When semaphore management is taken into consideration, the lock read and unlock write signals must always be used to access the semaphore header by OS address management, and normal read/write access is not performed. However, since the bus is interlocked, even a read/write bus cycle free from a semaphore influence cannot be sent out, and a bus throughput is decreased.

SUMMARY OF THE INVENTION

The present invention eliminates the conventional drawbacks described above, and has as its object a bus lock control apparatus which does not interlock a bus to increase a bus throughput.

In order to achieve the above object of the present invention, there is provided a bus lock control apparatus comprising a bus arbiter having register means for storing bus lock enable information in correspondence with a plurality of agents, and lock acknowledging means for acknowledging an OR signal of all pieces of information of the register means to agents connected to the common bus, wherein the lock acknowledging means is latched after a lapse of a predetermined period of time when a bus lock request or bus lock release request is enabled in the bus arbiter.

BRIEF DESCRIPTION OF THE DRAWINGS

FIGS. 2A to 2F are timing charts showing a sequence for shifting a state from a locked state to an unlocked state, and FIGS. 3A to 3F are timing charts of a lock disable sequence.

DESCRIPTION OF THE PREFERRED EMBODIMENT

Figure 1:
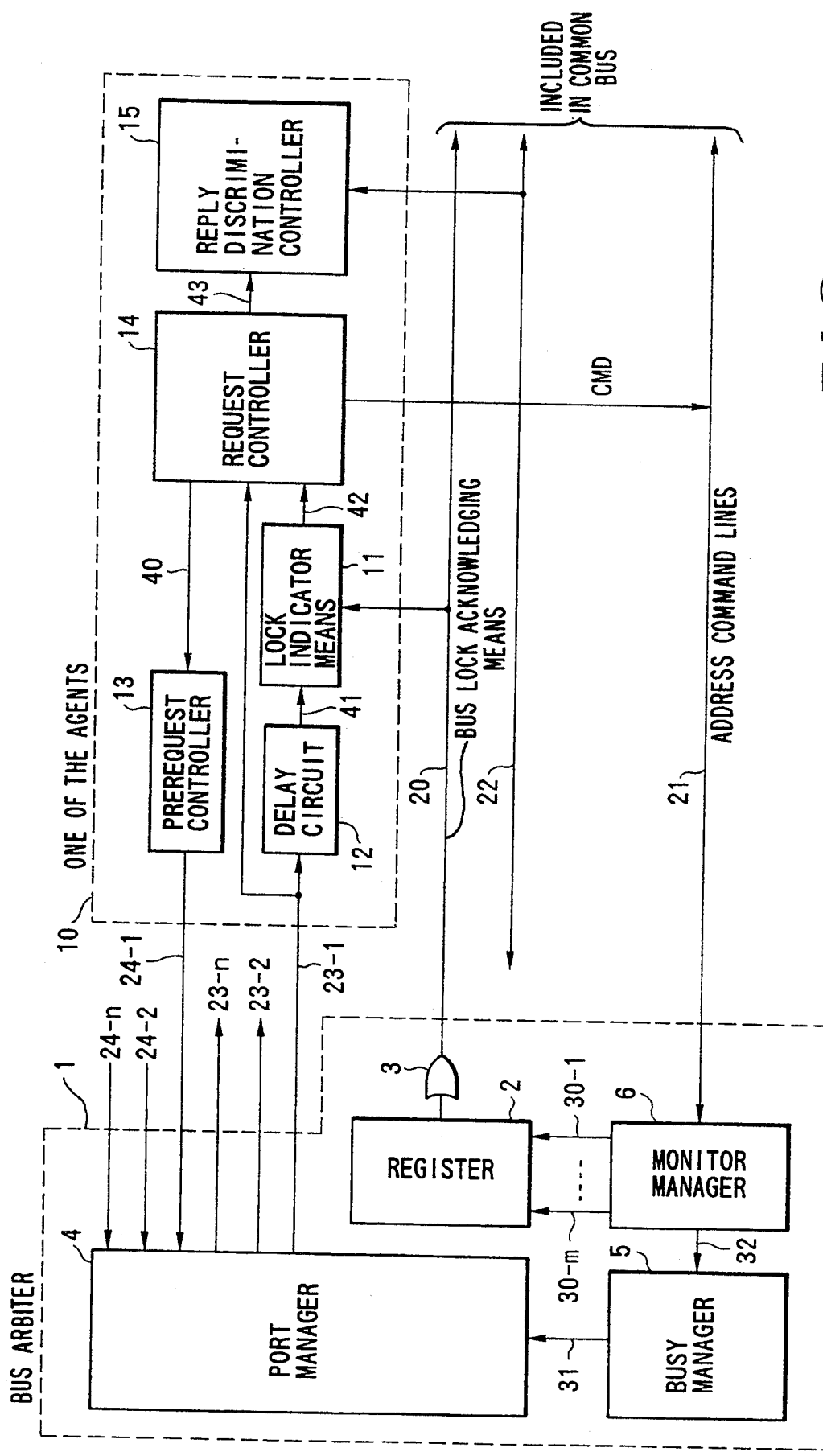
FIG. 1 is a block diagram showing an embodiment of the present invention.

An embodiment of the present invention will be described hereinafter with reference to the accompanying drawings.

FIG. 1 shows an embodiment of the present invention. Referring to FIG. 1, a bus arbiter 1 includes a port manager 4, a busy manager 5, a monitor manager 6, a register 2 and an OR gate 3. The port manager 4 receives initial resource use requests 24-1 to 24-n from a plurality of agents connected to a common bus and performs control until bus use enable signals 23-1 to 23-n are output. The busy manager 5 controls set a busy time for an agent which has received a bus use enable signal and busy times of other agents in accordance with an agent which is in actual operation. The monitor manager 6 checks a first initial resource use request code corresponding to the bus use enable signal and a resource which is actually requested to be used via an address command line 21. The register 2 sets/resets one bit corresponding to a request source agent from the monitor manager 6 by using control lines 30-1 to 30-m when a lock read request or an unlock write request is sent through the address command line 21. The register 2 then stores a locked state of the common bus. The OR gate 3 is arranged to output an OR signal of all bits of the register 2. An agent 10 connected to the common bus includes a prerequest controller 13, a request controller 14, a delay circuit 12, a lock indicator means 11, and a reply discrimination controller 15. The prerequest controller 13 outputs an initial resource use request to the bus arbiter 1, and the request controller 14 outputs the resource use request to the address command line 21. The delay circuit 12 delays a bus use enable signal 23-1 from the bus arbiter 1 by a predetermined period (e.g., 3T). The lock indicator means 11 latches the OR signal from the OR gate 3, i.e., a lock acknowledging means 20 on the common bus after a lapse of the predetermined period (3T) when the bus use enable signal 23-1 is enabled by an output 41 from the delay circuit 12 and a signal line 42 for discriminating lock read transmission from the request controller 14 from unlock write transmission therefrom. The reply discrimination controller 15 discriminates a relay response line 22 to acknowledge a bus transfer state from a slave agent to a master agent, when the agent 10 serves as the master agent and other agents serve as the slave agents.

Bus lock control processing of the bus lock control apparatus having the above arrangement will be described with reference to timing charts in FIGS. 2A to 2F and 3A to 3F. A control sequence in FIGS. 2A to 2F shows a change in state from the unlocked state to the locked state, and vice versa, and the control sequence in FIGS. 3A to 3F is a lock disable sequence.

When a lock read operation of a memory by the agent connected to the common bus is to be performed, an initial resource use request (FIG. 2A) is sent from the prerequest controller 13 to the bus arbiter 1 through the control line 24-1. The bus arbiter 1 causes the port manager 4 to detect a bus busy state and initial resource use requests from other agents and selects an appropriate agent. For example, the agent 10 is selected, and a bus use enable signal 23-1 (FIG. 2B) is supplied from the arbiter 1 to the agent 10. When the bus use enable signal 23-1 is supplied from the port manager 4 to the agent 10, the request controller 14 in the agent 10 outputs a lock read command CMD (FIG. 2C) to the address command line 21 of the bus. The monitor manager 6 in the bus arbiter 1 always monitors this address command line 21 and sets one bit of the register 2 at a bit position corresponding to the agent 10 by using the control lines 30-1 to 30-m when the lock read command CMD is output. The content of the register 2 is acknowledged to each agent connected to the bus by using the signal line lock acknowledging means 20 via the OR gate 3 (FIG. 2E). When the lock acknowledging means 20 is set at "0", the bus is set in an unlocked state. However, when the lock acknowledging means 20 is set at "1", the bus is set in the locked state. The lock acknowledging means 20 is changed after a lapse of 3T when the lock read request or unlock write request is output to the address command line 21, and this timing is kept constant. The agent 10 which requested the lock read operation latches the state of the lock acknowledging means 20 after a lapse of 3T when the bus use enable signal 23-1 is set at "1" by the signal 41 from the delay circuit 12 and a signal 42 representing the lock read request. At this time, the complement of the content of the lock acknowledging means 20 is locked by the lock indicator means 11 to synchronize the state of change in the lock acknowledging means 20 with that of the lock indicator means 11 (FIGS. 2E and 2F). When the agent 10 refers to the state of the lock indicator means 11, the agent 10 can check if it is during locking (FIG. 2D). Since the bus arbiter 1 does not completely interrupt bus arbitration, it is possible for any other agent to use the bus.

An operation for changing the state from the locked state to the unlocked state by a write unlock request will be described. When the agent 10 connected to the common bus is to perform an unlock write operation of the memory, the agent 10 sends an initial resource use request 24-1 (FIG. 2A) from the prerequest controller 13 to the bus arbiter 1 via the control line 24-1. The bus arbiter 1 causes the port manager 4 to detect a bus busy state and initial resource use requests from other agents and selects an appropriate agent. For example, the agent 10 is selected, and a bus use enable signal 23-1 (FIG. 2B) is supplied from the bus arbiter 1 to the agent 10. When the bus use enable signal 23-1 is supplied from the port manager 4 to the agent 10, the request controller 14 in the agent 10 sends out an unlock write command CMD (FIG. 2C) to the address command line 21. The monitor manager 6 in the bus arbiter 1 always monitors the address command line 21 and resets one bit of the register 2 to "0" at a position corresponding to the agent 10 by using the control lines 30-1 to 30-n along which the unlock write command is output. The content of the register 2 is sent to each agent connected to the common bus by using the signal line lock acknowledging means 20 on the bus through the OR gate 3 (FIG. 2E). When the lock acknowledging means 20 is set at "0", the bus unlocked state is represented. However, when the lock acknowledging means 20 is set at "1", the bus locked state is represented. The lock acknowledging means 20 is changed after a lapse of 3T when the lock read or unlock write request is output to the address command line 21. This timing is kept unchanged. The agent 10 which requested the lock read operation latches the state of the lock acknowledging means 20 after a lapse of 3T when the bus use enable signal 23-1 is set at "0" by the signal 41 from the delay circuit 12 and the signal 42 representing the lock read request. At this time, the complement of the content of the lock acknowledging means 20 is locked by the lock indicator means 11 to synchronize the state of change in the lock acknowledging means 20 with that of the lock indicator means 11 (FIGS. 2E and 2F). When the agent 10 refers to the state of the lock indicator means 11, the agent 10 can check if it is during locking (FIG. 2D).

A maximum of one bit of the register 2 in the bus arbiter 1 is set. Since the agent corresponding to the set bit can be set, the number of agents which can acquire the lock command detected by the bus arbiter 1 is a maximum of one agent. Only one agent is available to change the state from the unlocked state to the locked state, and only one agent is also available to be released by the unlock write command.

An operation performed upon the output of a read lock request from a given agent in the locked state of the lock acknowledging means 20 will be described with reference to FIGS. 3A to 3F.

As shown in FIGS. 3A to 3C, a sequence between the bus arbiter 1 and the master agent 10 is the same as that described with reference to FIGS. 2A to 2F. The relationship between the lock acknowledging means 20 and the lock indicator means 11 will be described below.

When an agent other than the agent 10 acquires the locked state, the content of the register 2 is kept unchanged, and the lock acknowledging means 20 is kept at "1" (FIG. 3E). The agent 10 causes an inverter to invert the content of the bus acknowledging means 20 after a lapse of 3T from when a bus transmission request in the lock read mode is received, and sets the inverted content in the lock indicator means 11. At this time, the content of the lock indicator means 11 is kept at "0", which represents the unlocked state (FIG. 3F). Therefore, the agent 10 cannot acquire the locked state (FIG. 3D).

In this embodiment, the agent itself can detect whether the locked state is set or not. The amount of hardware can be reduced, and bus adjustment need not be interrupted. Therefore, bus throughput can be increased.

According to the present invention as has been described above, since the agent itself can detect whether the locked state is set, bus adjustment need not be interrupted and a bus throughput can be increased.

What is claimed is:

1. A bus lock control apparatus having a common bus, a plurality of agents connected to said common bus and a single bus arbiter, said single bus arbiter being connected to receive initial resource use request signals one by one from each of said agents and to send bus use enable signals one by one to each of said agents, to receive initial resource use requests from each of said agents and to send a bus use enable signal only to one specific agent serving as a bus master agent, to utilize resources connected to said bus, the lock control apparatus comprising:

a monitor manager for acknowledging a bus lock request, a bus lock release request and a requesting agent from a resource use request sent to address command lines in said common bus from said agent serving as a bus master, and outputting to each agent a set signal in the case of a bus lock request and a reset signal in the case of a bus lock release request, said bus arbiter having a register means comprising a plurality of bits corresponding to a plurality of agents for registering bus lock enable information in accordance with a set or reset signal from said monitor manager, and an OR circuit for executing a logical sum for all information bits of said register means, said common bus having a lock acknowledging means for connecting an output of said OR circuit to all said agents in a single line, and each one of said agents having a delay circuit for delaying a bus use enable signal from said bus arbiter for a constant period of time, and a lock indicator means inputting an output of the delay circuit and a bus lock/bus lock release signal and for latching a logical complement of the content of said lock acknowledging means in said common bus, when the output of said delay circuit and said bus lock/bus lock release signal are valid, said bus lock/bus lock release signal being outputted from a request controller outputting a resource use request signal to address command lines in said common bus;

wherein said delay circuit generates a timing signal one clock faster than a timing of said lock acknowledging means in said common bus, by means of said a bus use enable signal from said bus arbiter, and an agent having a lock indicator means for latching a logical complement of the content of the lock acknowledging means in said common bus when said bus lock/bus lock release signal from said request controller and a signal from said delay circuit become valid.

* * * * *